(No Model.)
P. J. MILLER.
FASTENER FOR ENVELOPES, BOXES, &c.
No. 411,045. Patented Sept. 17, 1889.
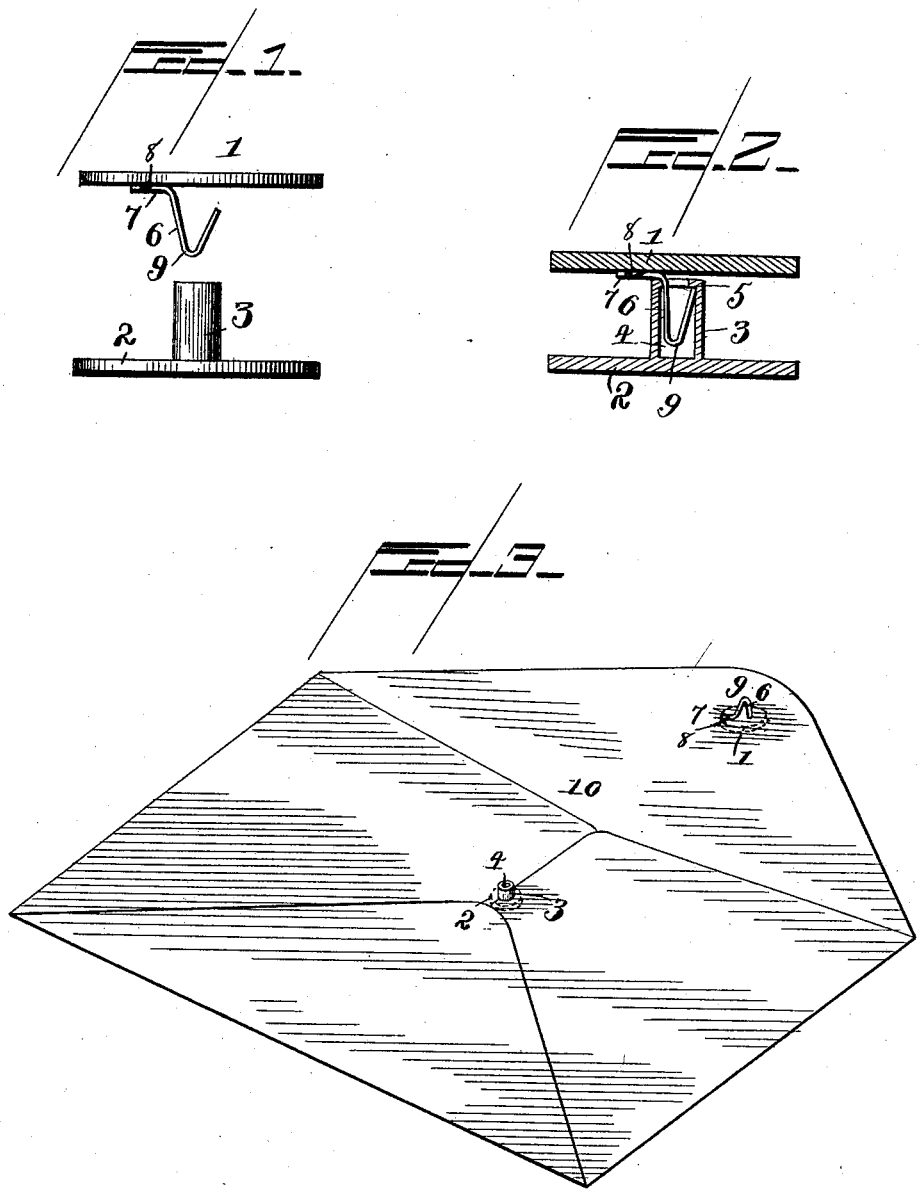

UNITED STATES PATENT OFFICE.

PETER J. MILLER, OF UPPER LEHIGH, PENNSYLVANIA.

FASTENER FOR ENVELOPES, BOXES, &c.

SPECIFICATION forming part of Letters Patent No. 411,045, dated September 17, 1889.

Application filed April 27, 1889. Serial No. 308,814. (No model.)

*To all whom it may concern:*

Be it known that I, PETER J. MILLER, a citizen of the United States, residing at Upper Lehigh, in the county of Luzerne and State of Pennsylvania, have invented a new and useful Fastener for Envelopes, Boxes, &c., of which the following is a specification.

This invention has relation to fasteners for envelopes, express and other packages, light boxes, and other articles, though it is more especially adapted for the first-mentioned use, whereby the ordinary gumming of flaps of envelopes is avoided, and for the same is substituted a neat and convenient fastener, so constructed as to prevent the opening of the envelope without destroying the fastener, and thus making that fact known to the receiver.

The object and advantages of the invention will hereinafter appear, and the novel features thereof will be particularly pointed out in the claim.

Referring to the drawings, Figure 1 represents a fastener constructed in accordance with my invention, the same being shown in side elevation. Fig. 2 is a central vertical section of Fig. 1, the same being locked. Fig. 3 shows my invention applied to an envelope and ready for locking.

Like numerals of reference indicate like parts in all the figures of the drawings.

The fastener consists of two disks of similar size, and lettered, respectively, 1 and 2. To the lower disk, which I will term the "socket-disk," is secured, or it may be formed thereon, a lug 3, centrally bored, as at 4, and having formed within its bore, near the upper end thereof, an annular shoulder 5, thus reducing the open end of the socket or lug.
The opposite plate consists of the before-mentioned disk 1, and depending from the same is a V-shaped hook 6. The hook 6 is formed of very light spring metal, and one end thereof is bent at right angles to the remaining portion, as at 7, and is secured to the disk 1 in a separable manner by means, in this instance, of a small drop of solder 8. The opposite end of the spring 6 terminates short of the disk 1, and is bent intermediate of its two ends, as at 9. The disk 1 is preferably applied to the flap 10 of the envelope, as shown, and the disk 2 to the envelope itself, and preferably within the same, the disk 1 being on the outside of the flap, and having the spring projected through an opening formed for that purpose, as is also the lug or socket 3.

The back of the disk 1 may be suitably ornamented either by cheap stamping or otherwise, and may bear the coats of arms of the sender, or any other insignia desirable.

From this description it will be apparent that by inserting the bent end 9 of the spring 6 into the bore 4 of the socket the free end of the spring, after passing the shoulder 5, will spring under the same, and thus the two disks be locked together. It will also be apparent that in order to separate the disks the connection 8 between the spring and disk 1 must be broken. By this all tampering with letters and resealing the same is avoided.

Having thus described my invention, what I claim is—

The combination, with an envelope, of the disk 2, connected to the inside of its rear wall and provided with the lug 3, bored as at 4, projected through and disposed at a right angle to said wall, and having the annular internal recess 5, and of the disk 1, mounted on the outside of the flap of the envelope and having the spring-tongue 6, bent as at 7 and 9, and secured to the disk, as at 8, and passing through the flap, said tongue being adapted for insertion in the bore and to take under the shoulder therein, substantially as specified.

In testimony that I claim the foregoing as my own I have hereto affixed my signature in presence of two witnesses.

PETER J. MILLER.

Witnesses:
  JOHN M. POWELL,
  CHARLES F. McHUGH.